(12) United States Patent
Takase et al.

(10) Patent No.: US 6,338,888 B1
(45) Date of Patent: Jan. 15, 2002

(54) OPTICAL RECORDING MEDIUM AND METHOD OF INFORMATION RECORDING/REPRODUCTION USING THE SAME

(75) Inventors: Yoshiyuki Takase, Katano; Yoshihiro Tosaki, Ibaraki; Katsuyuki Takahashi, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/423,244

(22) PCT Filed: May 7, 1998

(86) PCT No.: PCT/JP98/02021

§ 371 Date: Nov. 5, 1999

§ 102(e) Date: Nov. 5, 1999

(87) PCT Pub. No.: WO98/50915

PCT Pub. Date: Nov. 12, 1998

(30) Foreign Application Priority Data

May 8, 1997 (JP) ............................................. 9-117825

(51) Int. Cl.[7] ................................................ B32B 3/02
(52) U.S. Cl. ................. 428/64.1; 428/64.8; 430/270.16
(58) Field of Search ............................. 428/64.1, 64.2, 428/64.4, 64.8, 913; 430/270.16, 495.1, 945; 369/283, 288

(56) References Cited

U.S. PATENT DOCUMENTS

| 5,328,741 A | 7/1994 | Yanagisawa et al. |
| 5,627,817 A | 5/1997 | Rosen et al. |

FOREIGN PATENT DOCUMENTS

| EP | 676 751 | 10/1995 |
| EP | 755 052 | 1/1997 |
| JP | 8-263873 | 10/1996 |
| JP | 8-273193 | 10/1996 |
| JP | 8-339573 | 12/1996 |
| JP | 9-54979 | 2/1997 |

*Primary Examiner*—Elizabeth Evans
(74) *Attorney, Agent, or Firm*—Wenderoth, Lind & Ponack, L.L.P.

(57) ABSTRACT

The optical recording medium includes at least a recording layer, a recording supplemental layer, a reflection layer and a protection layer on a light permeable substrate, each of the recording layer and the recording supplemental layer is made mainly of an organic pigment material, with the optical recording medium, recording and reproducing is possible using a laser beam having a wavelength of $\lambda 1$ and also recording and/or reproducing is possible using a laser beam having a wavelength of $\lambda 2$ which is shorter than $\lambda 1$, a spectral absorbance of the recording layer is in the range between 5% and 35% at a wavelength of $\lambda 1$ and not less than 15% at a wavelength of $\lambda 2$, and the recording supplemental layer has a peak of spectral reflectance at a wavelength in the vicinity of $\lambda 2$.

23 Claims, 4 Drawing Sheets

OPTICAL RECORDING MEDIUM AND METHOD OF INFORMATION RECORDING/REPRODUCTION USING THE SAME

FIELD OF THE INVENTION

The present invention related to an optical recording medium, and particularly to an optical recording medium which is able to record and/or reproduce while using a plurality of laser beam wavelengths as well as a method of recording and/or reproducing information in which such an optical recording medium is used.

BACKGROUND ART

Recently, an optical recording medium (such as CD-R, CD-RW (re-writable) and the like) of a single substrate type has been proposed and developed which is capable of recording information (including recording other information in addition to already recorded information) according to the specification for compact disc (hereinafter referred to as CD) and which has a high beam reflection ratio (or reflectance).

As one example of the above optical recording mediums, CD-R will be explained below. As schematically shown in FIG. 4 which shows a portion of a cross section perpendicular to the disc surface, this optical recording medium comprises a transparent substrate 1 having grooves 6 on which a recording layer 2, a reflection layer 3 and a protection layer 4 are laminated in the listed order. A reflectance at the groove 6 is not less than 65% before recording, which is reduced by a laser beam having a high power (i.e. a recording beam) to form pits since the recording layer has been changed physically and/or chemically. Thus formed pits have the reduced reflectances, so that portions having such different reflectances resulted with the irradiated laser beam make it possible to record information. Also, reproduction of the information can be carried out by irradiating a laser beam having a less power onto portions of the optical recording medium and detecting reflectance changes.

For the recording/reproducing with the optical recording medium, a laser beam having a wavelength in the range between 770 nm and 830 nm is generally used. However, a laser beam having a wavelength in the range between 620 nm and 690 nm is used for DVD which has been recently available as an optical recording medium having a larger capacity. Reflectances of the mediums conventionally used for CD for AV (audio-visual) or CD-ROM for computers are less dependent on the laser beam wavelengths so that those mediums are readily used for reproduction by DVD players.

On the other hand, since pigments (or dyes) are used in the conventional CD-R mediums, the reflectances of the mediums are more dependent on the laser beam wavelengths: The reflectance is not less than 65% at a laser beam wavelength of around 780 nm. However, since the pigments used for the recording layer absorb a larger amount of beam having a wavelength in the range between about 620 nm and 690 nm, the reflectance for such a beam is as small as around 10%. Therefore, it is very difficult to reproduce information which is recorded in a CD-R according to the CD specification using a DVD player. In order to overcome the above interchangeability problem (i.e. that the DVD player is not able to reproduce the information recorded according to the CD specification), there have been attempts to provide a plurality of enhancing layers having different optical constants of inorganic materials (such as $SiO_2$) between the substrate and the recording layer, so that the reflectance at a laser beam wavelength in the range between about 620 nm and 690 nm is improved by means of an interference effect.

However, it is not necessarily easy to merely use the enhancing layers having the different optical constants as described to sufficiently improve the reflectance. Further, even though the reflectance is improved by some degree, no sufficient modulation is obtained, and recording sensitivity is lowered so that signal qualities are not satisfactory. Due to the reasons as described, it has been very difficult to provide an optical recording medium having interchangeability between the CD player and the DVD player (that is, an optical recording medium form which the recorded information is able to be reproduced using either player).

SUMMARY OF THE INVENTION

In order to achieve the object as described above, the present invention provides an optical medium comprising a transparent substrate which contains thereon at least a recording layer, a recording supplemental (or auxiliary) layer, a reflection layer and a protection layer, wherein: the recording layer and the recording supplement layer contain organic pigments as their main components; the optical recording medium is able to record and/or reproduce using a laser beam having a wavelength of $\lambda 1$, and also able to record and/or reproduce using a laser beam having a wavelength of $\lambda 2$ which is shorter than $\lambda 1$; the recording layer has a spectral (or spectroscopic) absorbance in the range between 5% and 35% at a wavelength of $\lambda 1$ and a spectral absorbance in the range not less than 15% at a wavelength of $\lambda 2$; and the recording supplemental layer has a peak of a spectral reflectance at a wavelength in the vicinity of $\lambda 2$.

the recording supplemental layer has a peak of a spectral reflectance at a wavelength in the vicinity of $\lambda 2$.

With the optical recording medium according to the present invention, it is preferable that the spectral (or spectroscopic) reflectance measured through the substrate varies with a wavelength of the beam, and that the spectral reflectance shows a maximum peak at a wavelength in the vicinity of $\lambda 2$, and as the wavelength is increased from $\lambda 2$ thereafter, and the spectral reflectance is decreased and shows a minimum peak at a wavelength between $\lambda 1$ and $\lambda 2$ followed by being increased.

It is to be noted that the optical recording medium according to the present invention may be in any of the following embodiments:

(1) An embodiment in which recording/reproducing by means of a laser beam having a wavelength of $\lambda 1$ as well as recording/reproducing by means of a laser beam having a wavelength of $\lambda 2$ is possible;

(2) An embodiment in which recording by means of a laser beam having a wavelength of $\lambda 1$ as well as reproducing by means of a laser beam having a wavelength of $\lambda 2$ is possible; and (3) An embodiment in which recording by means of a laser beam having a wavelength of $\lambda 2$ as well as reproducing by means of a laser beam having a wavelength of $\lambda 1$ is possible. That is, with the optical recording medium according to the present invention, both of recording and reproducing are possible with respect to two kinds of wavelengths $\lambda 1$ and $\lambda 2$, and alternatively recording is possible with respect to one wavelength of $\lambda 1$ and $\lambda 2$ and reproducing is possible with respect to the other wavelength of $\lambda 2$ and $\lambda 1$. In any embodiment, the optical recording medium according to the present invention may be referred to as an "optical recording medium applicable to two kinds of wavelengths" since it is used with respect to the two kinds of wavelengths.

Figure 1:
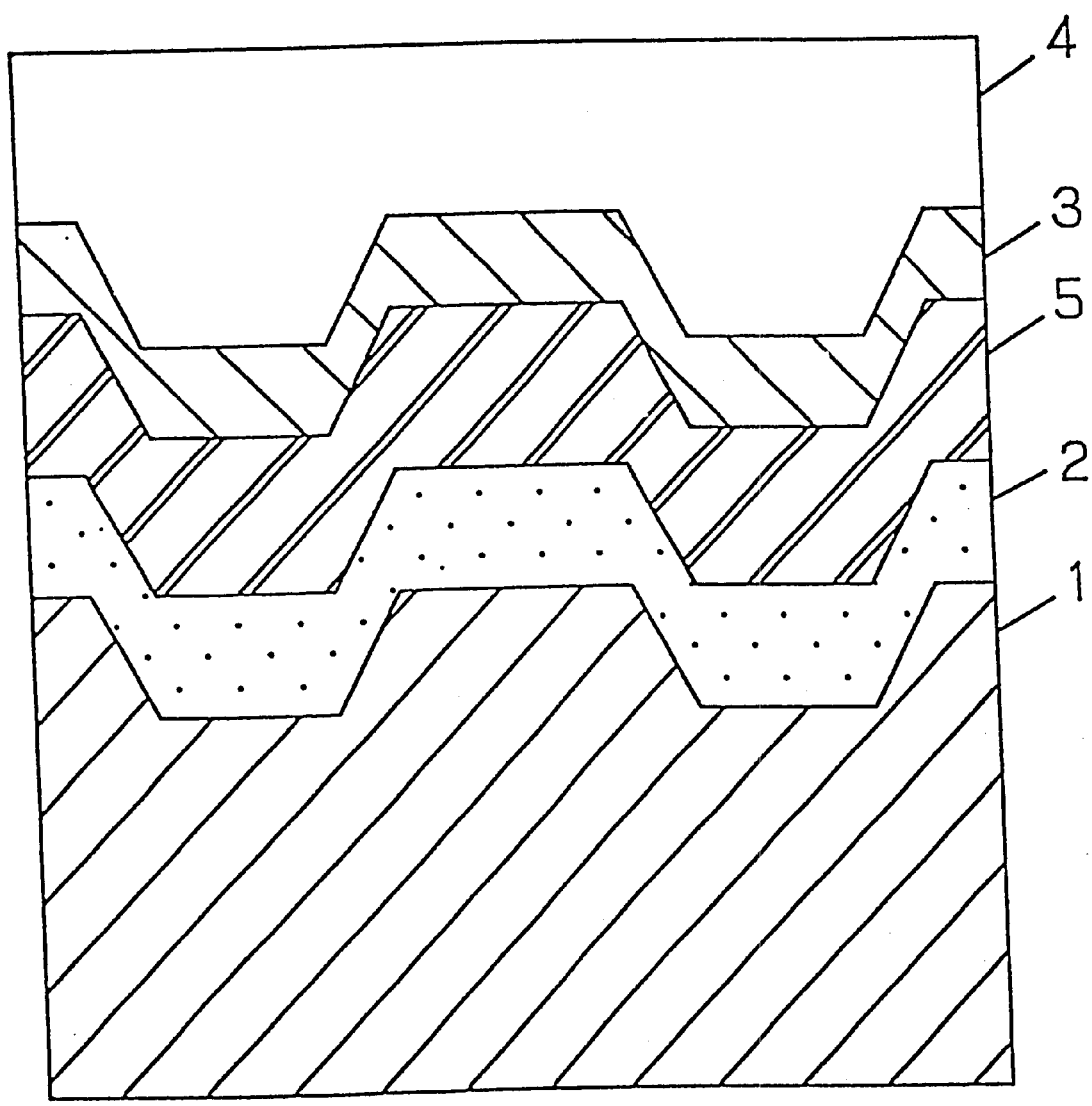
FIG. 1 schematically shows a portion of a cross-section which is perpendicular to a round surface of a substrate of an optical recording medium according to the present invention.

In the drawings, reference numbers indicate the following members:

1 ... substrate, 2 ... recording layer, 3 ... reflection layer, 4 ... protection layer, 5 ... recording supplemental layer, 6 ... groove

DESCRIPTION OF THE PREFERRED EMBODIMENTS

In the present invention, the optical recording medium includes both an optical recording medium which is supplied while information has been recorded beforehand in a portion thereof, in which another information is further recorded in the remaining portion thereof, and from which the already recorded and the further recorded information are reproduced, and an optical recording medium which is supplied while no information has been recorded beforehand, in which information is recorded, and from which the recorded information are reproduced. Since both optical recording mediums are the same from a viewpoint that the information is recorded and reproduced, the latter optical recording medium with which the information is recorded and from which the information is reproduced is explained as one example and such explanation is also applied to the former optical recording medium.

The optical recording medium according to the present invention has a fivefold structure (five layer structure) for example as shown in FIG. 1. That is, the recording layer 2 is provided on the substrate 1 through which the beam is penetrated, the recording supplemental layer 5 is provided on the recording layer 2, the reflection layer 3 is provided on the recording supplemental layer 3, and the protection layer 4 is further provided on the reflection layer 3 so as to cover it. Between each adjacent ones of the layers, an intermediate layer (for example a bonding layer, an enhancing layer and the like) may be inserted if necessary. Further, by providing more than one recording supplemental layers each having a spectral reflectance peak at a different beam wavelength, it is possible to record and/or reproduce at each of more than two different wavelengths. Namely, an "optical recording medium applicable to three kinds of wavelengths" is possible.

In the optical recording medium according to the present invention, the recording layer and the recording supplemental layer which are formed on the substrate transparent with respect to the beam are layers each of which is made mainly of an organic pigment. The optical recording medium according to the present invention is able to record and/or reproduce information using a laser beam having a wavelength of $\lambda 1$. Further, the medium is also able to record and/or reproduce information using a laser beam having a wavelength of $\lambda 2$ which is shorter than $\lambda 1$. Further, the recording layer is characterized in that its spectral absorbance ratio is in the range between 5% and 35% and preferably in the range between 5% and 20% at a wavelength of $\lambda 1$, and in the range of not less than 15% and preferably in the range between 15% and 60% at a wavelength of $\lambda 2$, and a spectral reflectance curve with respect to the wavelength includes a peak of the spectral reflectance (a maximum peak) in the vicinity of the wavelength of $\lambda 2$. The peak may have a spectral reflectance of at least 5% and preferably at least 20%, and such a peak is present within the range of $\lambda 2 \pm 100$ nm, preferably $\lambda 2 \pm 50$ nm, more preferably $\lambda 2 \pm 20$ nm and even more preferably $\lambda 2 \pm 10$ nm.

As described above, with the optical recording medium according to the present invention, it is preferable that the spectral reflectance varies with the beam wavelength when measured through the substrate such that the spectral reflectance shows a maximum peak at a wavelength around $\lambda 2$ and is then reduced as the wavelength is increased, which is followed by the presence of the minimum peak in the range between $\lambda 1$ and $\lambda 2$ and then by the increase thereof. The peak position and height as to such spectral reflectance measured through the substrate may be substantially the same as or more or less different from the peak position and height of the recording supplemental layer as described above.

Figure 2:
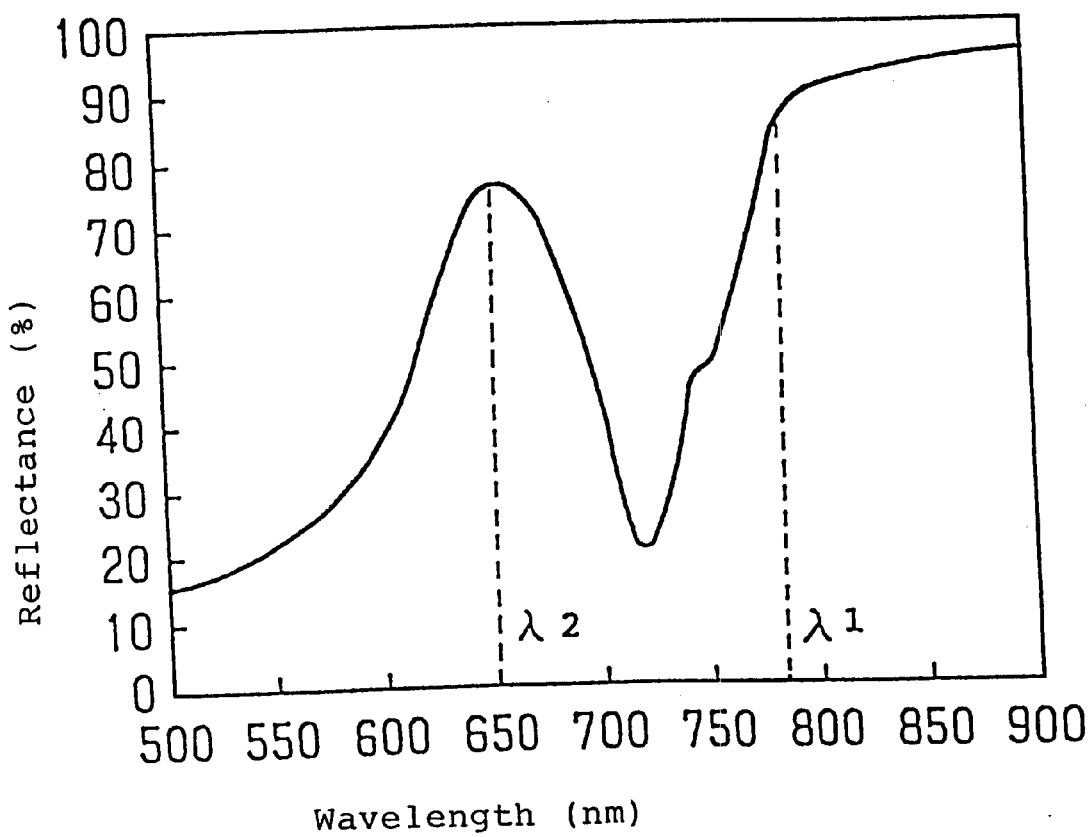
FIG. 2 is a graph which shows a spectral reflectance measured through a substrate of an unrecorded area of an optical recording medium which is produced in Example 1.

With the optical recording medium according to the present invention, the reflectance when measured through the substrate in the information non-recorded area has for example a curve of which shape is as shown in FIG. 2. In this case, the reflectance-wavelength curve shows a peak reflectance at a wavelength of 650 nm as $\lambda 2$, then decrease with increase of the wavelength, and then a minimum peak in the range between $\lambda 2$ and $\lambda 1$ (for example 780 nm) followed by increase thereof. As clearly seen from the drawing, the optical recording medium has a proper reflectance between $\lambda 1$ and $\lambda 2$, and the recording layer has a predetermined spectral absorbance between $\lambda 1$ and $\lambda 2$ as described before, so that even when a beam having a wavelength of either $\lambda 1$ or $\lambda 2$ is irradiated, the recording layer absorbs the beam by an appropriate extent and decomposes and/or is modified, and due to heat generated upon the absorption, the substrate deforms and/or the recording supplemental layer decomposes and/or is modified, whereby optical interference states are changed (for example distorted) between the recording layer and the recording supplemental layer and optionally the substrate. As a result, the spectral reflectance when measured through the substrate is reduced at least one of $\lambda 1$ and $\lambda 2$, and preferably at both of $\lambda 1$ and $\lambda 2$.

Figure 3:
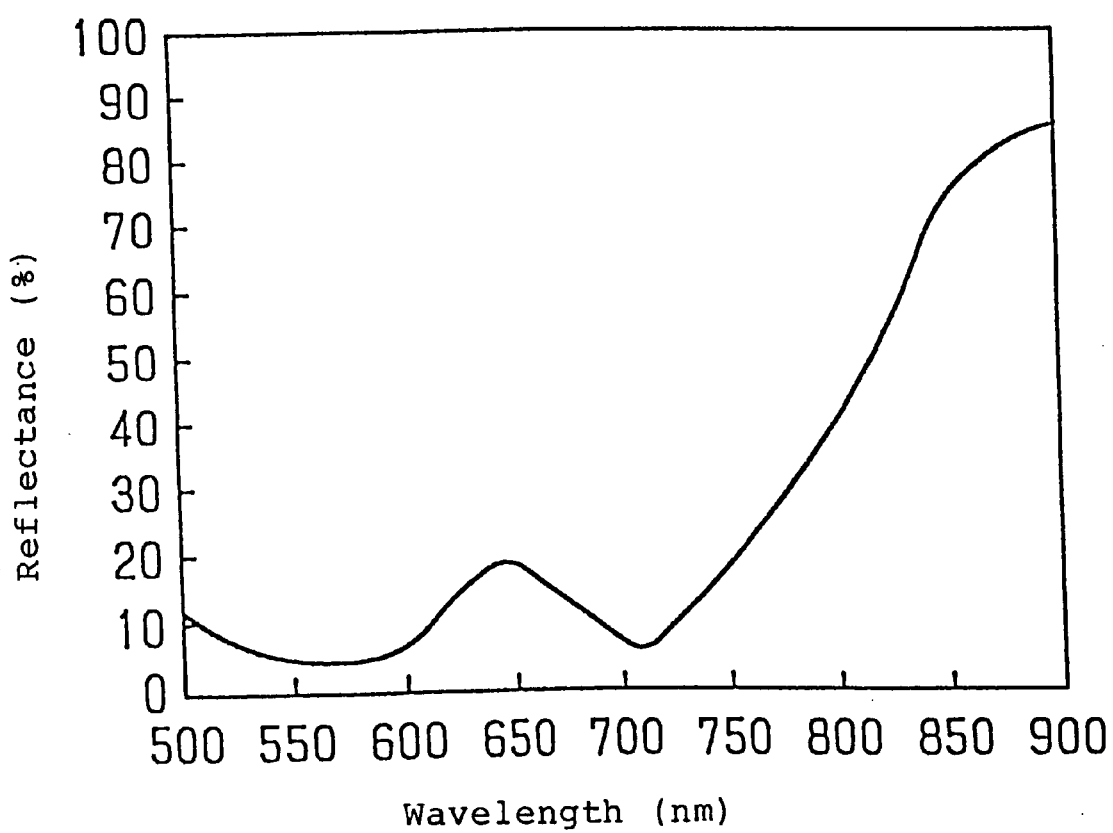
FIG. 3 is a graph which shows a spectral reflectance measured through a substrate of a recorded area of an optical recording medium which is produced in Example 1.
Figure 4:
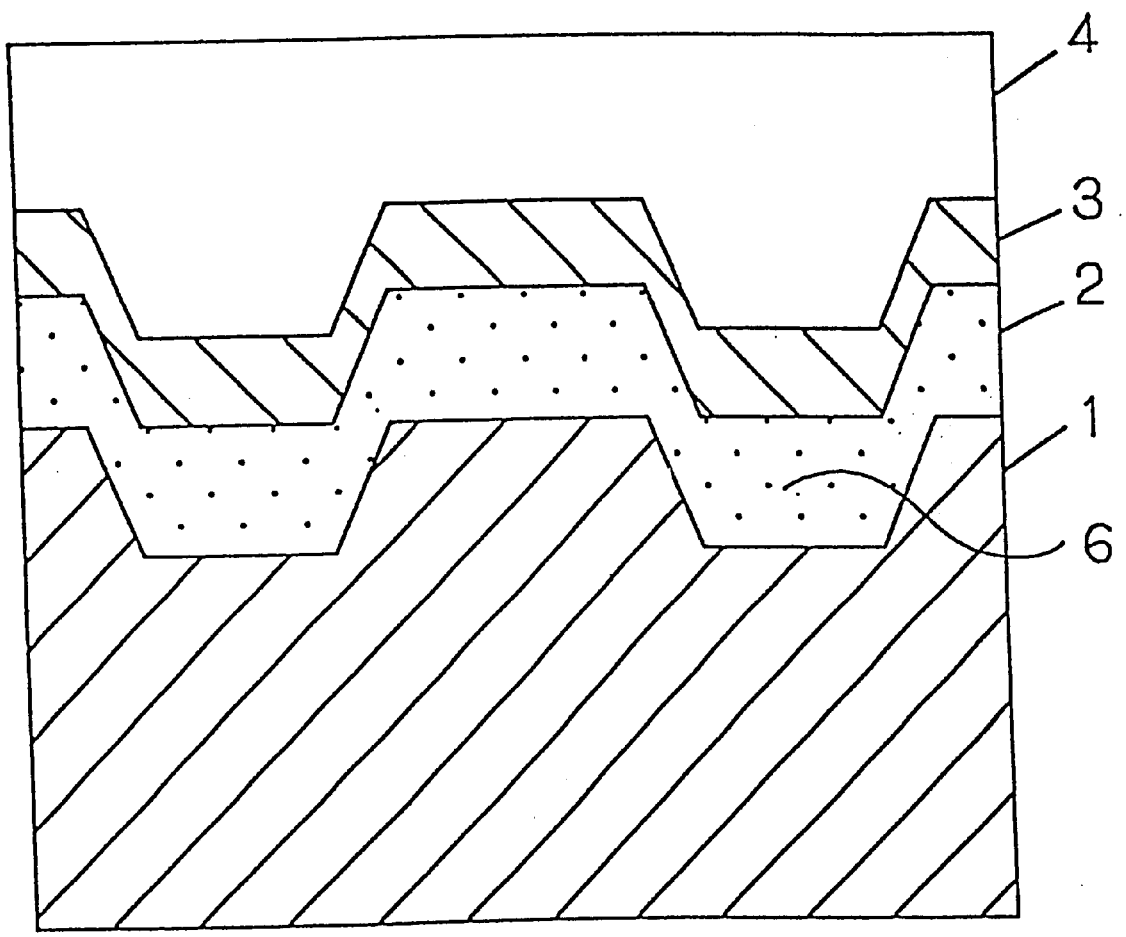
FIG. 4 schematically shows a portion of a cross-section which is perpendicular to a round surface of a substrate of an optical recording medium of the prior art.

Thus, the optical recording medium according to the present invention covers the following cases:

(1) A case wherein when a beam having a wavelength of any of $\lambda 1$ and $\lambda 2$ is irradiated, the optical reflectances at $\lambda 1$ and $\lambda 2$ are reduced in the optical interference state changed portion (for example, the case as shown in FIG. 3);

(2) A case wherein when a beam having a wavelength of $\lambda 1$ is irradiated, the optical reflectance at $\lambda 2$ is reduced in the optical interference state changed portion; and (3) A case wherein when a beam having a wavelength of $\lambda 2$ is irradiated, the reflectance ratio at $\lambda 1$ is reduced in the optical interference state changed portion. In the embodiment as shown in FIG. 3, sufficiently large changes of the spectral reflectance are observed at $\lambda 1$ and $\lambda 2$, but the change of the spectral reflectance may be only either one.

When the spectral absorbance of the recording layer becomes no larger than 5% at a wavelength of $\lambda 1$, the recording layer cannot absorb a sufficient amount of the irradiated beam so that a sufficient recording sensitivity is not obtained at a wavelength of $\lambda 1$ (it is noted that recording power is required to be sufficiently greater for the sufficient recording sensitivity), and when the spectral absorbance of the recording layer becomes no less than 35% at a wavelength of $\lambda 1$, a sufficient reflectance is not obtained at a wavelength of $\lambda 1$. Also, when the spectral absorbance of the recording layer becomes no larger than 15% at a wavelength of $\lambda 2$, the recording layer cannot absorb a sufficient amount of the irradiated beam so that a sufficient recording sensitivity is not obtained at a wavelength of $\lambda 2$. Further, the provision of the recording supplemental layer which has a peak of the spectral absorbance at a wavelength in the vicinity of $\lambda 2$ improves the reflectance of the optical recording medium at a wavelength of $\lambda 2$ (i.e., the reflectance measured through the substrate).

In one embodiment of the optical recording medium according to the present invention, $\lambda 1$ is preferably a wavelength of a laser beam which is used for recording/reproduction of a CD, for example a wavelength in the range between 780 nm and 830 nm, and $\lambda 2$ is preferably a wavelength of a red laser beam which is used for recording/reproduction of a DVD, for example, a wavelength in the range between 620 nm and 690 nm. The laser which irradiates a red beam having a wavelength in the range between 620 nm and 690 nm may be concretely a semiconductor laser having a resonance wavelength in the vicinity of 680 nm, 650 nm or 635 nm. The optical recording medium according to the present invention is recordable and/or reproducible at one or more wavelengths selected from those three wavelengths, and also it is recordable and/or reproducible at a laser wavelength selected from the range between 770 nm and 830 nm.

Selection of the recording layer having the above described spectral absorbance and the recording supplemental layer having the above described spectral reflectance may be carried out based on the spectral absorbance and the spectral reflectance of pigment materials themselves as ones of measures, which will be listed below. That is, optical absorption properties and optical reflection properties which are inherent to the pigment materials correlate to the optical absorption properties and the optical reflection properties of the recording layer and the recording supplemental layer which are produced using the pigment materials. Generally, it is often that the pigment materials as well as the recording layer or the recording supplemental layer made of the pigment materials have substantially similar or approximate spectral absorbance ratio vs. wavelength curves or substantially approximate spectral reflectance vs. wavelength curves.

Thus, it is sufficient that the pigment material of which spectral absorbance is in the range between 5% and 35% at a wavelength of $\lambda 1$ and of which spectral absorbance is not less than 15% at a wavelength of $\lambda 2$ is generally selected for the recording layer. Also, it is sufficient that the pigment material of which spectral absorbance curve has a peak at a wavelength in the vicinity of $\lambda 2$ is generally selected for the recording supplemental layer. It is of course possible to select the recording layer and the recording supplemental layer which satisfy the above described specific conditions by selecting the pigment materials and forming the recording layer and the recording supplemental layer while using the materials and by measuring the absorbances or the reflectances of the layers in terms of the trial-and-error method.

The organic pigment which constitutes the recording layer or which is contained in the recording layer in the present invention is such that it makes the spectral absorbance of the recording layer itself be in the range between 5% and 35% at a wavelength of $\lambda 1$ and in the range not less than 15% at a wavelength of $\lambda 2$. When the spectral absorbance is less than 5% at a wavelength of $\lambda 1$, the recording sensitivity with respect to a laser beam having a wavelength of $\lambda 1$ is lowered, so that a very higher power is required upon recording, which is not so practical. Similarly, when the spectral absorbance is less than 15% at a wavelength of $\lambda 2$, the recording sensitivity with respect to a laser beam having a wavelength of $\lambda 2$ is lowered. Further, when the spectral absorbance is not less than 35% at a wavelength of $\lambda 2$, the reflectance of the recording layer is lowered so that it is difficult to satisfy the CD specifications.

Concrete examples of the organic pigment which constitutes the recording layer or which is contained in the recording layer include the following pigments: pentamethinecyanine pigments, heptamethinecyanine pigments, squarylium pigments, azo pigments, anthraquinone pigments, indophenol pigments, phthalocyanine pigments, naphthalocyanine pigments, pyrylium pigments, thiopyrylium pigments, azulenium pigments, triphenylmethane pigments, xanthene pigments, indanthrene pigments, indigo pigments, thioindigo pigments, merocyanine pigments, thiazine pigments, acridine pigments, oxazine pigments, dithiol metal complex pigments and etc. It is often possible that the wavelength-spectral absorbance properties of these pigments depend on substituents which the pigments contains, so that even among the same based pigments the beam absorption properties may be greatly different. Preferably, the pigment selected from the phthalocyanine pigments, naphthalocyanine pigments, azo pigments and the cyanine pigments may be used or a mixture of a plurality of such pigments may be used for the recording layer. Further, the recording layer may contain a known additive such as a quencher and a ultraviolet absorbent.

On the other hand, the organic pigment which constitutes the recording supplemental layer or which is contained in the recording supplemental layer is such that the recording supplemental layer itself has a spectral reflectance peak at a wavelength in the vicinity of $\lambda 2$. The spectral reflectance of the peak is not less than 15%, and preferably not less than 25%. When the spectral reflectance is smaller than such figure (15%), it is difficult to read a reproduced signal at a wavelength of $\lambda 2$.

Concrete examples of the organic pigment which constitutes the recording supplemental layer or which is contained in the recording supplemental layer include the following pigments: cyanine pigments, squarylium pigments, azo pigments, naphthquinone pigments, anthraquinone pigments, porphiline pigments, tetrapirraporphrazine pigments, indophenol pigments, pyrylium pigments, thiopyrylium pigments, azulenium pigments, triphenylmethane pigments, xanthene pigments, indanthrene pigments, indigo pigments, thioindigo pigments, merocyanine pigments, thiazine pigments, acridine pigments, oxazine pigments and etc. Similar to the above description for the recording layer, it is often possible that the wavelength-spectral reflectance properties of these pigments may be greatly changed depending on a substituent which the pigment contains even within the same basic pigments. Preferably, the pigment selected from the cyanine pigments and the melocyanine pigments may be used for the recording supplemental layer or a mixture of a plurality of such pigments may be used for the recording supplemental layer. Further, as in the above description for the recording layer, the recording layer may contain a known additive such as a quencher and an ultraviolet absorbent.

It is noted that the recording layer and the recording supplemental layer may contain those which are within the same basic pigments (or belong to the same basic kind) as long as those two are not completely the same compounds.

As to the optical recording medium according to the present invention, the recording supplemental layer contains the cyanine pigment or the merocyanine pigment in a particularly preferable embodiment. In general, the cyanine pigments and the merocyanine pigments have good spectral reflectance peaks at wavelengths within the range between 620 nm and 690 nm. Thus, the inclusion of these pigments within the recording supplemental layer is particularly effective in that the reflectance of the optical recording medium at a wavelength of $\lambda 2$ is improved.

As to the optical recording medium according to the present invention, the recording layer contains the phthalocyanine pigment in a particularly preferable embodiment. The phthalocyanine pigments have preferable spectral absorbances as specified in the present invention at wavelengths within the ranges between 770 nm and 830 nm and also between 620 nm and 690 nm, and when those pigments are formed into a layer, the layer also has the preferable spectral absorbance.

In one embodiment of the optical recording medium according to the present invention, the spectral reflectance thereof is not less than 65% and preferably not less than 70% at a wavelength of $\lambda 1$ and the peak value of the spectral reflectance at a wavelength in the vicinity of $\lambda 2$ is not less than 15% and preferably not less than 30% (the reflectance is measured through the substrate). When the spectral reflectance at a wavelength of $\lambda 1$ is not less than 65%, the CD specifications are satisfied. In addition, when the spectral reflectance at a wavelength in the vicinity of $\lambda 2$ is less than 15%, the optical recording medium properties are degraded (for example signal detection using the laser beam having a wavelength $\lambda 2$ becomes difficult). Thus, the spectral reflectance of not less than 15% at a wavelength in the vicinity of $\lambda 2$ is suitable for the optical recording medium.

The optical recording medium according to the present invention, in one preferable embodiment, comprises the recording layer, the recording supplemental layer and the reflection layer are directly or through an intermediate layer on the substrate in the order of the layers as listed. By providing the layers in such order, jitter of reproduced signals may be made low, which is suitable for the optical recording medium. It is noted that the intermediate layer is a layer which is optionally formed such as a bonding layer and an enhancing layer.

The stacking order of the recording layer and the recording supplemental layer may be reversed. However, for example, in order to decrease the jitter, it is preferable that the recording layer, the recording supplemental layer, the reflection layer and the protection layer are formed on the substrate in the above listed order, which would be based on the following action: When a laser beam having a wavelength of $\lambda 1$ or $\lambda 2$ is irradiated for recording on to the optical recording medium having the above described structure, the organic pigment which forms the recording supplemental layer is also decomposed and/or modified partly, but the organic pigment which forms the recording layer 2 is mainly decomposed and/or modified while generating heat. Thus, by forming the recording layer, the recording supplemental layer, the reflection layer and the protection layer on the substrate in the above listed order, the substrate adjacent to the recording layer is effectively melted and/or deformed upon recording, and/or the recording supplemental layer adjacent to the recording layer is effectively decomposed and/or modified upon recording, resulting in the formation of pits which are optically uniform, which leads to clear contrast between the recorded portions and non-recorded portions upon reproduction. Thereby, waveform properties are improved, which reduces, for example, the jitter.

As to the optical recording medium, in one preferable embodiment, recording and reproducing are possible using a laser beam having a wavelength of $\lambda 1$, and reproducing is possible using a laser beam having a wavelength of $\lambda 2$ which is shorter than $\lambda 1$. Thereby, signals which meet the CD specification can be recorded with a CD recorder, and the recorded signals can be reproduced with any of a CD player and a DVD player. That is, the interchangeability is achieved.

As to the optical recording medium according to the present invention, in one preferable embodiment, a wavelength of $\lambda 1$ of the laser beam selected from the range between 770 nm and 830 nm and a wavelength of $\lambda 2$ of the laser beam is selected from the range between 620 nm and 690 nm. By the selection of the wavelengths of $\lambda 1$ and $\lambda 2$ from those ranges, there is provided a optical recording medium having the interchangeability between the CD player and the DVD player.

The present invention provides a method of recording and/or reproducing information in which the optical recording medium of the present invention as described above is used. Since the recording supplemental layer is provided which has the spectral reflectance peak (measured through the substrate) at a wavelength in the vicinity of $\lambda 2$, the spectral reflectance of the optical recording medium (measured through the substrate) also has the spectral reflectance peak at a wavelength in the vicinity of $\lambda 2$. When a beam having a wavelength of $\lambda 1$ or $\lambda 2$ is irradiated, either the recording layer or the recording supplemental layer or both of the recording layer and the recording supplemental layer are decomposed and/or modified by means of beam absorption properties of the recording layer, and in addition the substrate and/or the recording supplemental layer are affected by heat generated at that time, so that the substrate is deformed or the recording supplemental layer is decomposed (or modified), which breaks the optical interference state having been already formed by the recording layer, the recording layer and the recording supplemental layer, whereby the spectral reflectance in the vicinity of the peak wavelength is greatly reduced. Further, generally the spectral reflectance at a wavelength of $\lambda 1$ is reduced, and preferably greatly reduced. Therefore, when either of the beams each having a wavelength of $\lambda 1$ or $\lambda 2$ is irradiated, the optical properties of the optical recording medium represented by the spectral reflectance through the substrate are greatly changed. Thus, information is able to be recorded, and the interchangeability between the wavelengths of $\lambda 1$ and $\lambda 2$ as to recording and/or reproducing is easily achieved.

The recording layer and the recording supplemental layer are formed by the known processes such as an application process (for example a spin coating process), a sputtering process, a chemical vapor deposition process, a vacuum vapor deposition process and so on. In an embodiment in which the two layers are adjacent directly, the vacuum vapor deposition is particularly preferable since a clear interface between the two layers are formed. The vacuum vapor deposition process herein is a process in which the pigment material is heated and evaporated in a highly vacuum pressure atmosphere (generally not more than $10^{-3}$ torr) and the evaporated pigment material is deposited on a substrate or a layer which has been already present.

The thickness of the recording layer can affect the spectral absorbance thereof, and selected by selecting the pigment material based on its optical properties as described above and by optionally changing the thickness of the layer such that it provides the predetermined spectral absorbance. Generally, the thickness may be in the range between 30 nm and 300 nm, and preferably in the range between 35 nm and 150 nm. When the thickness becomes thinner than specified, the recording sensitivity is reduced, and in addition, distortion of the reproduced signals is often enhanced. Further, when the thickness is greater than specified, the reflectance is reduced and the amplitude of the reproduced signals is often reduced.

On the other hand, the thickness of the recording supplemental layer can affect the spectral reflectance thereof, and selected by selecting the pigment material based on its optical properties as described above and optionally by changing the thickness of the layer such that it provides the predetermined spectral reflectance. Generally, the thickness may be in the range between 30 nm and 300 nm, and preferably in the range between 50 nm and 150 nm. When the thickness becomes thinner than specified, the reflectance improvement at a wavelength of $\lambda 2$ is often impossible. Further, when the thickness is greater than specified, for example the jitter is increased so that qualities of the reproduced signals are often deteriorated.

In the optical recording medium according to the present invention, known techniques up to now are applicable to elements thereof (for example, the substrate, the reflection layer, the protection layer and so on) with an exception of the recording layer and the recording supplemental layer. Those techniques will be explained briefly.

Basically, the material for the substrate 1 is transparent with respect to the beams (namely, beam permeable) for recording and reproducing. For example, the following are preferably used: a macromolecular material such as a polycarbonate resin, a polyvinyl chloride resin, an acrylic resin such as a polymethyl methacrylate resin, a polystyrene resin, an epoxy resin and so on as well as an inorganic material such as glass. These materials are formed into a round shape as a disc by means of, for example, an injection molding process. On one surface of the substrate, a spiral groove is formed as desired. Generally, when the substrate is used for CD, it is a disc shape having a thickness of about 1.2 mm and a diameter of about 80 mm or 120 mm as well as a center hole of which diameter is about 15 mm.

The material which forms the reflection layer in the present invention is basically such that it provides high reflectance at wavelengths of beams used for recording and reproducing. For example, Au, Al, Cu, Cr, Pt, Ni, Ti and so on as well as an alloy thereof may be used. As a process for the production of the reflection layer, a vapor deposition process, a sputtering process, an ion plating process, a chemical vapor deposition process and so on may be used.

As to the material for the protection layer of the optical recording medium according to the present invention, there is no specific limitation as long as its strength is sufficient to protect the reflection layer. It is desirable that the material is a resin having a good impact resistance as well as a small shrinkage property upon curing. The protection layer may be produced by application of a UV curable resin by means of the spin coating method followed by irradiating a UV beam so as to cure the resin. Besides the resin, an epoxy resin, an acrylic resin, a silicone resin for hard coating and so on may be used.

With the optical recording medium thus constructed as above, its reflectance measured through the substrate is not less than 65% with respect to the beam having a wavelength in the range between 770 nm and 830 nm, and the reflectance peak of not less than 15% and preferably not less than 30% in the vicinity of $\lambda 2$ in the range between 620 nm and 690 nm is present. The spectral reflectance around the peak is greatly reduced by breaking the optical interference structure of the recording layer and the recording supplemental layer when either or both of the recording layer and the recording supplemental layer are just slightly deformed or decomposed. Thus, the interchangeability between the wavelengths of $\lambda 1$ and $\lambda 2$ is easily achieved.

According to the present invention, forming the recording layer and the recording supplemental layer containing the organic pigments of which spectral properties are different provides an optical recording medium in which recording and/or reproducing is possible while using a red laser having a wavelength in the range between 620 nm and 690 nm and recording and/or reproducing is possible while using a laser having a wavelength in the range between 770 nm and 830 nm. That is, by using the enhancing effect through the recording supplemental layer (an optical interference effect between the recording layer and the recording supplemental layer), the reflectance as to each laser wavelength is improved prior to recording, which allows recording/reproducing having increased modulation. Therefore, the thicknesses of the recording layer and the recording supplemental layer are selected while considering the enhancing effect produced by means of the optical interference at each wavelength between those layers.

The present invention provides the two wavelength applicable optical recording medium as described above, and with such optical recording medium, it is of course possible to record information by irradiating a beam having a wavelength of $\lambda 1$ (or $\lambda 2$) and to reproduce recorded information by using a beam having a wavelength of $\lambda 1$ (or $\lambda 2$). That is, the present invention inherently includes a single wavelength applicable optical recording medium which comprises the recording layer and the supplemental recording layer. Namely, the optical recording medium of the present invention according to the present invention may be used as DVD-R or CD-R.

EXAMPLES

Examples of the present invention will be explained below:

Example 1

A substrate made of a polycarbonate was used which had a diameter of 120 mm, a thickness of 1.2 mm, and a groove on one surface thereof (having a width of 0.7 $\mu$m, a depth of 70 nm, a pitch of 1.6 $\mu$m). On the substrate surface having the groove, a phthalocyanine compound (FOM-0509 manufactured by Wako Pure Chemicals Industries, Ltd.) represented by:

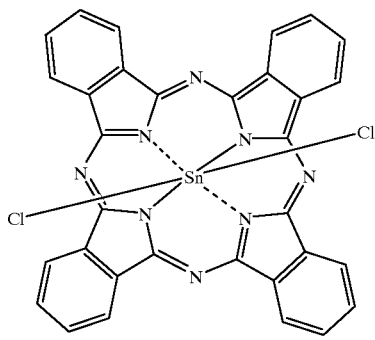

(1)

was deposited to form a recording layer having a thickness of 55 nm. The recording layer has a spectral absorbances of 15% at a wavelength of 780 nm and 45% at a wavelength of 650 nm.

Subsequently, on the recording layer, a melocyanine compound (NK2097 manufactured by Nippon Kankoh-Shikiso Kenkyusho Co., Ltd.) represented by:

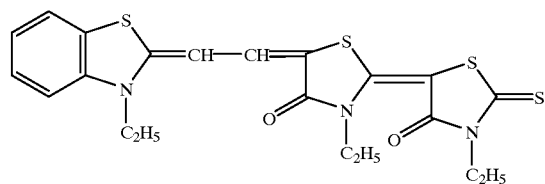

(2)

was deposited to form a recording supplemental layer having a thickness of 95 nm. The recording supplemental layer has a spectral reflectance of 40% at a wavelength of 655 nm. It is noted that the spectral reflectance and the spectral absorbance/were obtained beforehand by measurement of each layer having the specified thickness which layer was formed on a glass plate.

Further, on the recording supplemental layer, a reflection layer having a thickness of 70 nm was formed by means of sputtering Ag, and a protection layer having a thickness of 5 μm was formed using a UV curable acrylic resin, whereby an optical recording medium was produced.

Example 2

In this example, an optical recording medium was produced in the same manner as in Example 1 except that the laminating order of the recording layer and the recording supplemental layer was reversed, so that the phthalocyanine compound of formula (1) as the recording supplemental layer was deposited after the melocyanine compound of formula (2) was deposited as the recording layer.

Comparative Example 1

In this example, an optical recording medium for comparison was produced in the same manner as in Example 1 except that the recording supplemental layer was omitted.

Comparative Example 2

In this example, an optical recording medium for comparison was produced in the same manner as in Example 1 except that the recording layer was omitted.

With the optical recording mediums produced as described above, recording of EFM (eight to fourteen modulation) signals was carried out at a linear velocity of 1.4 m/sec. using an optical recording medium evaluation apparatus (DDU-1000 manufactured by Pulstec Industrial Co., Ltd.) equipped with a semiconductor laser (having a wavelength of 780 nm) and an optical recording medium evaluation apparatus (DDU-1000 manufactured by Pulstec Industrial Co., Ltd.) equipped with a semiconductor laser (having a wavelength of 650 nm), and then reproduction of the signals was carried out while measuring reflectances and jitter values. Further, using a CD player (SL-S170 manufactured by Matsushita Electric Industrial Co., Ltd.) a CD player (CDP-2700 manufactured by SONY Corporation), a DVD-player (DVD-A300 manufactured by Matsushita Electric Industrial Co., Ltd.) a DVD-player (DV-7 manufactured by Pioneer Electronic Corp.) and a DVD-player (SD3000 manufactured by Toshiba Corporation), reproduction states were observed.

The results are shown in Table 1 below:

TABLE 1

| | 780 nm Reproduction | | | 650 nm Reproduction | | |
|---|---|---|---|---|---|---|
| | Reflectance (%) | Jitter (ns) | CD Reproduction State | Reflectance (%) | Jitter (ns) | DVD Reproduction State |
| 780 nm Recording | | | | | | |
| Exam. 1 | 74 | 21 | ○ | 62 | 30 | ○ |
| Exam. 2 | 74 | 34 | ○ | 64 | 43 | ○ |
| Comp. Exam. 2 | 70 | 40 | ○ | 31 | 50 | X |
| Comp. Exam. 2 | — | — | — | — | — | — |
| 650 nm Recording | | | ○ | | | |
| Exam. 1 | 72 | 21 | ○ | 61 | 30 | ○ |
| Exam. 2 | 71 | 37 | ○ | 64 | 43 | ○ |

TABLE 1-continued

|  | 780 nm Reproduction | | | 650 nm Reproduction | | |
| --- | --- | --- | --- | --- | --- | --- |
|  | Reflectance (%) | Jitter (ns) | CD Reproduction State | Reflectance (%) | Jitter (ns) | DVD Reproduction State |
| Comp. Exam. 2 | 67 | 43 | ○ | 31 | 50 | X |
| Comp. Exam. 2 | 65 | 50 | X | 45 | 40 | ○ |

*Jitter measurements were with respect to T11.
*The reproduction states of CD were evaluated as follows:
When the reproduction as CD was possible using each CD player, ○ was designated; and when such reproduction was impossible or unstable; X was designated.
*The reproduction states of DVD were evaluated as follows:
When the reproduction as CD was possible using each DVD players, ○ was designated; and when such reproduction was impossible or unstable, X was designated.
*In Table, "—" means that the measurement was impossible.

The graph shown in FIG. 2 was obtained by the measurement of the spectral reflectance of a non-recorded portion of the optical recording medium produced in Example 1 (the measurement was carried out through the substrate). The graph shown in FIG. 3 was obtained by the measurement of the spectral reflectance of a recorded portion of the optical recording medium produced in Example 1 using a laser beam having a wavelength of 780 nm (the measurement was carried out through the substrate).

As shown in FIGS. 2 and 3 as well as Table 1, the optical recording medium has the very high peak of the reflectance at a wavelength (650 nm) in the vicinity of $\lambda 2$ through the effect of the recording supplemental layer having the reflectance peak at a wavelength (655 nm) in the vicinity of $\lambda 2$.

In addition, as seen from the comparison of FIG. 2 with FIG. 3, recording by means of the laser beam greatly reduces the spectral reflectance in the vicinity of the peak, so that the interchangeability between CD players and DVD players was obtained. Also, recording using a laser beam having a wavelength of $\lambda 2$ (650 nm) has become possible. Further, the provision of the recording supplemental layer made the jitter measurements of the reproduced signals small, and when the recording layer is formed closer to the substrate than the recording supplemental layer, the jitter measurements were further reduced.

Industrial Applicability

According to the present invention, by providing the recording supplemental layer which has the spectral reflectance peak at a wavelength in the vicinity of $\lambda 2$ selected from the range between 620 nm and 690 nm, the spectral reflectance of the optical recording medium can have a very high spectral reflectance peak in the vicinity of $\lambda 2$. Since the reflectance in the vicinity of such peak can be greatly reduced with either one of the laser beams having wavelengths of $\lambda 1$ and $\lambda 2$, not only does recording reproduction become possible using laser beams having wavelengths of $\lambda 1$ and $\lambda 2$ selected from the ranges between 770 nm and 830 nm and between 620 nm and 690 nm respectively, but also jitters of the reproduced signals are reduced. Therefore, the optical recording medium having the interchangeability between CD players and DVD players is provided.

What is claimed is:

1. An optical recording medium comprising:
    a recording layer, a recording supplemental layer, and a protection layer disposed on a light permeable substrate, wherein:
    each of said recording layer and said recording supplemental layer is made mainly from an organic pigment material;
    information can be recorded to and/or reproduced from said optical recording medium using a laser beam having a wavelength of $\lambda 1$;
    information can be recorded to and/or reproduced from said optical recording medium using a laser beam having a wavelength of $\lambda 2$ which is shorter than $\lambda 1$;
    a spectral absorbance of said recording layer is in a range between 5% and 35% at the wavelength of $\lambda 1$ and not less than 15% at the wavelength of $\lambda 2$; and
    said recording supplemental layer has a peak of spectral reflectance at a wavelength in the vicinity of $\lambda 2$.

2. The optical recording medium according to claim 1, wherein said recording supplemental layer contains a cyanine pigment or a merocyanine pigment.

3. The optical recording medium according to claim 2, wherein a spectral reflectance through said substrate of said optical recording medium is not less than 65% at a wavelength of $\lambda 1$, and a peak in the spectral reflectance through said substrate of said optical recording medium is not less than 15% at a wavelength in the vicinity of $\lambda 2$.

4. The optical recording medium according to claim 2, wherein said recording layer, said recording supplemental layer and said reflection layer are disposed in the listed order directly on said substrate or disposed on said substrate through an intermediate layer.

5. The optical recording medium according to claim 2, wherein recording and reproduction is possible using a laser beam having a wavelength of $\lambda 1$, and reproduction is possible using a laser beam having a wavelength of $\lambda 2$ which is shorter than $\lambda 1$.

6. The optical recording medium according to claim 2, wherein the wavelength of $\lambda 1$ of the laser beam is selected from a range between 770 nm and 880 nm and the wavelength of $\lambda 2$ of the laser beam is selected from a range between 620 nm and 690 nm.

7. The optical recording medium according to claim 1, wherein a spectral reflectance through said substrate of said optical recording medium is not less than 65% at a wavelength of $\lambda 1$, and a peak in the spectral reflectance through said substrate of said optical recording medium is not less than 15% at a wavelength in the vicinity of $\lambda 2$.

8. The optical recording medium according to claim 7, wherein said recording layer, said recording supplemental layer and said reflection layer are disposed in the listed order directly on said substrate or disposed on said substrate through an intermediate layer.

9. The optical recording medium according to claim 7, wherein recording and reproduction is possible using a laser beam having a wavelength of λ1, and reproduction is possible using a laser beam having a wavelength of λ2 which is shorter than λ2.

10. The optical recording medium according to claim 7, wherein the wavelength of λ1 of the laser beam is selected from a range between 770 nm and 880 nm and the wavelength of λ2 of the laser beam is selected from a range between 620 nm and 690 nm.

11. The optical recording medium according to claim 1 wherein said recording layer, said recording supplemental layer and said reflection layer are disposed in the listed order directly on said substrate or disposed on said substrate through an intermediate layer.

12. The optical recording medium according to claim 11, wherein recording and reproduction is possible using a laser beam having a wavelength of λ1, and reproduction is possible using a laser beam having a wavelength of λ1, and reproduction is possible using a laser beam having a wavelength of λ2 which is shorter than λ1.

13. The optical recording medium according to claim 11, wherein the wavelength of λ1 of the laser beam is selected from a range between 770 nm and 880 nm and the wavelength of λ2 of the laser beam is selected from a range between 620 nm and 690 nm.

14. The optical recording medium according to claim 1, wherein recording and reproduction is possible using a laser beam having a wavelength of λ1, and reproduction is possible using a laser beam having a wavelength of λ2 which is shorter than λ1.

15. The optical recording medium according to claim 14, wherein the wavelength of λ1 of the laser beam is selected from a range between 770 nm and 880 nm and the wavelength of λ2 of the laser beam is selected from a range between 620 nm and 690 nm.

16. The optical recording medium according to claim 2, wherein the wavelength of λ1, of the laser beam is selected from a range between 770 nm and 880 nm and the wavelength of λ2 of the laser beam is selected from a range between 620 nm and 690 nm.

17. The optical recording medium according to claim 1, wherein λ1 is a wavelength of a laser beam which is used for recording and/or reproduction for a CD and λ2 is a wavelength of a laser beam which is used for recording and/or reproduction for a DVD.

18. The optical recording medium according to claim 1, wherein a thickness of said recording layer is within a range of 35 nm and 150 nm, and a thickness of said recording supplemental layer is within a range of 50 nm and 150 nm.

19. A method for recording information to an optical recording medium which comprises a recording layer, a recording supplemental layer, a reflection layer, and a protection layer disposed on a light permeable substrate, said method comprising:

recording information to the optical recording medium through the breakage of an optical interference structure between the recording layer and the recording supplemental layer, wherein:
 each of the recording layer and the recording supplemental layer is made mainly from an organic pigment material;
 information can be recorded to and/or reproduced from the optical recording medium using a laser beam having a wavelength of λ1;
 information can be recorded to and/or reproduced from the optical recording medium using a laser beam having a wavelength of λ2 which is shorter than λ1;
 a spectral absorbance of the recording layer is in a range between 5% and 35% at the wavelength of λ1 and not less than 15% at the wavelength of λ2; and
 the recording supplemental layer has a peak of spectral reflectance at a wavelength in the vicinity of λ2.

20. The method according to claim 19, wherein λ1 is a wavelength of a laser beam which is used for recording and/or reproduction for a CD and λ2 is a wavelength of a laser beam which is used for recording and/or reproduction for a DVD.

21. A method for reproducing information from an optical recording medium which comprises a recording layer, a recording supplemental layer, a reflection layer, and a protection layer disposed on a light permeable substrate, wherein the information has been recorded to the optical recording medium using a laser beam having a wavelength of λ1 or λ2, said method comprising:

reproducing information from the optical recording medium using a laser beam having a wavelength of λ1 or λ2, wherein:
 each of the recording layer and the recording supplemental layer is made mainly from an organic pigment material;
 information can be recorded to and/or reproduced from the optical recording medium using a laser beam having a wavelength of λ1;
 information can be recorded to and/or reproduced from the optical recording medium using a laser beam having a wavelength of λ2 which is shorter than λ1;
 a spectral absorbance of the recording layer is in a range between 5% and 35% at the wavelength of λ1 and not less than 15% at the wavelength of λ2; and
 the recording supplemental layer has a peak of spectral reflectance at a wavelength in the vicinity of λ2.

22. The method according to claim 21, wherein λ1 is a wavelength of a laser beam which is used for recording and/or reproduction for a CD and λ2 is a wavelength of a laser beam which is used for recording and/or reproduction for a DVD.

23. A method for recording information to an optical recording medium and for reproducing the recorded information from the optical recording medium, wherein the optical recording medium comprises a recording layer, a recording supplemental layer, a reflection layer, and a protection layer disposed on a light permeable substrate, said method comprising:

recording information to the optical recording medium using a laser beam having a wavelength of λ1 or λ2; and reproducing the recorded information from the optical recording medium using the laser beam having the wavelength of λ1 or λ2, wherein:
 each of the recording layer and the recording supplemental layer is made mainly from an organic pigment material;
 information can be recorded to and/or reproduced from the optical recording medium using a laser beam having a wavelength of λ1;
 information can be recorded to and/or reproduced from the optical recording medium using a laser beam having a wavelength of λ2 which is shorter than λ1;
 a spectral absorbance of the recording layer is in a range between 5% and 35% at the wavelength of λ1 and not less than 15% at the wavelength of λ2 and
 the recording supplemental layer has a peak of spectral reflectance at a wavelength in the vicinity of λ2.

* * * * *